J. W. McNEAL.
Feeding-Trough.
No. 224,206. Patented Feb. 3, 1880.
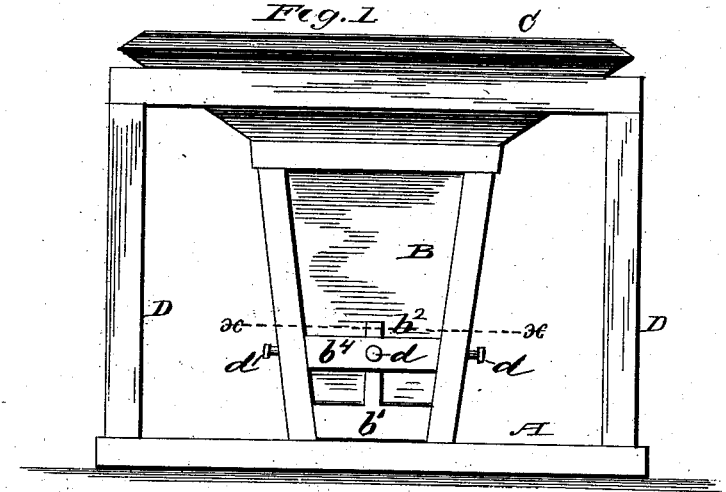
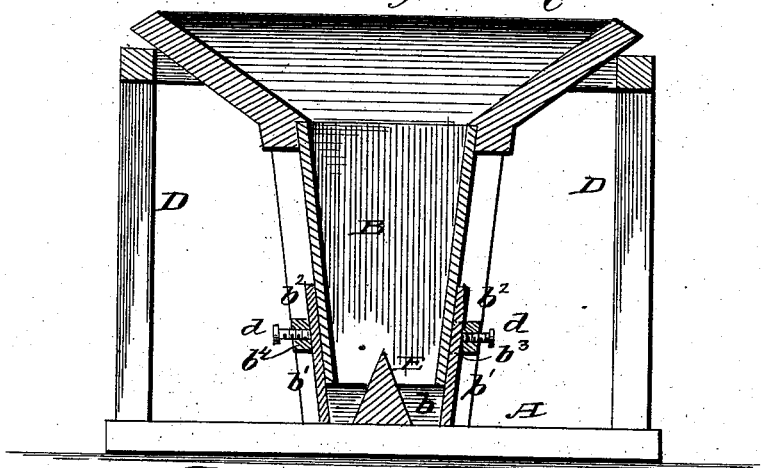
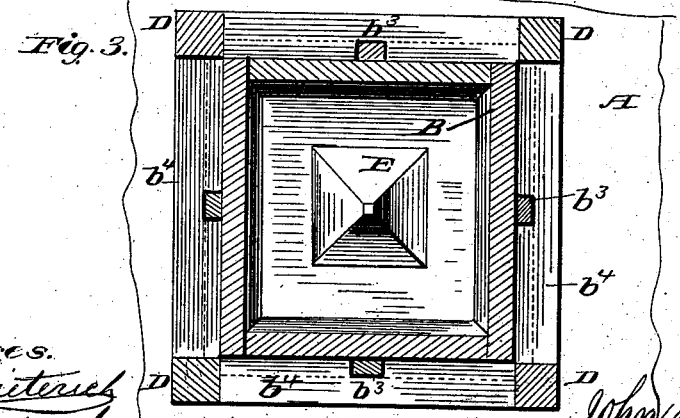
Witnesses.
Inventor
John W. McNeal
by Louis Bagger & Co.
Atty's

UNITED STATES PATENT OFFICE.

JOHN W. McNEAL, OF ROUNDHEAD, OHIO.

FEEDING-TROUGH.

SPECIFICATION forming part of Letters Patent No. 224,206, dated February 3, 1880.

Application filed October 21, 1879.

*To all whom it may concern:*

Be it known that I, JOHN W. MCNEAL, of Roundhead, in the county of Hardin and State of Ohio, have invented certain new and useful Improvements in Feeding-Troughs for Hog-Pens; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved feeding-trough. Fig. 2 is a vertical section, and Fig. 3 is a horizontal section, of the same, taken on the line $x\ x$ in Fig. 1.

Corresponding parts in the several figures are denoted by like letters.

This invention relates to feeding devices for animal pens or inclosures; and it consists in the construction and arrangement of parts of a trough adapted to form in itself a portion of the pen or inclosure, and provided with adjustable gates for regulating the amount of feed to which it is desired the animals shall have unobstructed access, substantially as hereinafter more fully set forth.

In the annexed drawings, A refers to the floor of the pen or inclosure, arranged about midway or centrally upon which said floor is a four-sided chute, B, emptying into which is a hopper, C, which may be made sufficiently large to form the roof of the pen, as shown, its outer elevated edge being supported by the posts D D, which also serve to support the boards or scantling which form the sides of the inclosure.

The lower end of the chute B is provided in each of its sides with an opening, $b$, through which to feed the grain or food placed into the chute to the hogs, the grain or food running out through said openings upon the floor of the pen.

$b'\ b'$ are gates or cut-offs arranged to open and close the grain or food feeding openings $b$ in the lower end of the chute, their handles or stems $b^2$ passing up through sockets or apertures $b^3$ in cross-pieces $b^4$, fastened to the sides of said end of chute, and which stems or handles are engaged by set or holding screws $d\ d$ to hold the said gates or valves at any desired height to control the feeding of the food through the openings $b$ into the pen to the hogs.

Disposed about centrally within the lower part of the chute B, with a suitable surrounding space between them, is a conical-shaped block, E, with its sides sloping toward the openings $b$, the object of which is to enable the spreading of the descending grain or food to expedite the feeding of the same through the openings $b$. The block or spreader E is secured to the floor of the pen in any known way.

Having thus described my improvement, I do not claim, broadly, a feeding-trough consisting of inclined sides forming a chute at the bottom of which is placed a block or ridge for deflecting the feed to the openings in the bottom of the chute, nor do I claim adjustable gates operating in conjunction with such chute and deflector; but

What I claim as my improvement, and desire to secure by Letters Patent of the United States, is—

In a feeder or feeding-trough of substantially the described construction, the combination, with the chute B, having vertically-slotted exterior cross bars or braces $b^4$, provided with set-screws $d$, of the vertically-adjustable gates $b'$, having shanks or extensions $b^2$ inserted through the slots in cross-bars $b^4$, as set forth.

In testimony that I claim the foregoing as my own I have hereunto affixed my signature in presence of two witnesses.

JOHN W. McNEAL.

Witnesses:
  ROBERT WHITE,
  HENRY M. CLINE.